(12) United States Patent
Kollár et al.

(10) Patent No.: US 11,444,346 B2
(45) Date of Patent: *Sep. 13, 2022

(54) BATTERY THERMAL MANAGEMENT SYSTEM FOR HYBRID AND FULL ELECTRIC VEHICLES USING HEAT CAPACITOR

(71) Applicant: Hanon Systems, Daejeon (KR)

(72) Inventors: L'uboslav Kollár, Poriadie (SK); Guillaume Hébert, Staré Město (CZ)

(73) Assignee: HANON SYSTEMS, Daejeon (KR)

( * ) Notice: Subject to any disclaimer, the term of this patent is extended or adjusted under 35 U.S.C. 154(b) by 56 days.

This patent is subject to a terminal disclaimer.

(21) Appl. No.: 17/071,003

(22) Filed: Oct. 15, 2020

(65) Prior Publication Data

US 2021/0028521 A1 Jan. 28, 2021

Related U.S. Application Data

(62) Division of application No. 16/026,148, filed on Jul. 3, 2018, now Pat. No. 10,847,851.

(Continued)

(51) Int. Cl.
*H01M 10/65* (2014.01)
*H01M 10/6568* (2014.01)
(Continued)

(52) U.S. Cl.
CPC ......... *H01M 10/6568* (2015.04); *B60L 58/26* (2019.02); *H01M 10/613* (2015.04);
(Continued)

(58) Field of Classification Search
CPC .......... H01M 10/6568; H01M 10/625; H01M 10/613; H01M 10/6551
See application file for complete search history.

(56) References Cited

U.S. PATENT DOCUMENTS

2010/0009246 A1* 1/2010 Maitre ................ H01M 10/617
429/62
2010/0012295 A1* 1/2010 Nemesh .............. H01M 10/663
165/104.19
(Continued)

FOREIGN PATENT DOCUMENTS

CN 205882117 U 1/2017
JP 2011093338 A 5/2011
(Continued)

*Primary Examiner* — Kenneth J Douyette
(74) *Attorney, Agent, or Firm* — Shumaker, Loop & Kendrick, LLP; James D. Miller

(57) ABSTRACT

A battery thermal management system includes a battery pack, a heat exchanger in fluid communication with the battery pack, a pump interposed between the heat exchanger and the battery pack to cause a heat exchange fluid to flow in a coolant loop between the heat exchanger and the battery pack. A heat capacitor is disposed downstream from the battery pack with respect to a direction of a flow of the heat exchange fluid through the coolant loop and upstream from the heat exchanger in the direction of the flow of the heat exchange fluid through the coolant loop. A valve is disposed in the coolant loop upstream from the heat capacitor in the direction of the flow of the coolant through the coolant loop. The valve controls at least a portion of the flow of the coolant through at least one of the heat capacitor and the heat exchanger.

17 Claims, 4 Drawing Sheets

Related U.S. Application Data

(60) Provisional application No. 62/571,564, filed on Oct. 12, 2017.

(51) Int. Cl.
| | |
|---|---|
| *H01M 10/625* | (2014.01) |
| *H01M 10/613* | (2014.01) |
| *H01M 10/6551* | (2014.01) |
| *H01M 10/659* | (2014.01) |
| *H01M 10/6556* | (2014.01) |
| *B60L 58/26* | (2019.01) |
| *H01M 10/6565* | (2014.01) |
| *H01M 10/6563* | (2014.01) |

(52) U.S. Cl.
CPC ....... *H01M 10/625* (2015.04); *H01M 10/659* (2015.04); *H01M 10/6551* (2015.04); *H01M 10/6556* (2015.04); *H01M 10/6563* (2015.04); *H01M 10/6565* (2015.04); *H01M 2220/20* (2013.01)

(56) References Cited

U.S. PATENT DOCUMENTS

| | | |
|---|---|---|
| 2012/0327596 A1 | 12/2012 | Anderson-Straley et al. |
| 2015/0135742 A1* | 5/2015 | Rousseau ............... B60L 58/26 62/98 |

FOREIGN PATENT DOCUMENTS

| | | |
|---|---|---|
| JP | 2014203736 A | 10/2014 |
| JP | 5996779 B2 | 9/2016 |
| KR | 20160074230 A | 6/2016 |
| KR | 20170013700 A | 2/2017 |
| WO | 2016133145 A1 | 8/2016 |

* cited by examiner

BATTERY THERMAL MANAGEMENT SYSTEM FOR HYBRID AND FULL ELECTRIC VEHICLES USING HEAT CAPACITOR

CROSS-REFERENCE TO RELATED APPLICATIONS

This patent application is a divisional patent application of U.S. patent application Ser. No. 16/026,148 filed on Jul. 3, 2018, which claims the benefit of U.S. Provisional Patent Application No. 62/571,564 filed on Oct. 12, 2017. The entire disclosures of which are hereby incorporated herein by reference.

FIELD

The present invention relates to a battery thermal management system, and more particularly to a battery thermal management system for a hybrid vehicle and an electric vehicle, wherein the thermal management system includes a heat capacitor.

BACKGROUND

Hybrid electric vehicles and electric vehicles use a motor to propel the vehicle. Electrical power is supplied to the motor by a battery. The battery is configured to store an electrical charge that may also be used to power other vehicle components. In hybrid electric vehicles, propelling the vehicle using the motor powered by the battery reduces the need for operating an internal combustion engine. Reducing operation of the internal combustion engine increases a fuel economy of the vehicle, which is desirable.

Efficient use of the battery is desirable and maximizes a distance the vehicle can be propelled by the motor. It is desirable to maintain the battery within a predetermined temperature range to achieve optimal performance and efficiency of the battery. This may be accomplished by using a cooling arrangement. Typically, there are three main technologies used to provide the cooling arrangement: air cooling, air conditioning refrigerant cooling, or liquid cooling.

Most known battery cooling systems currently use coolant as the cooling arrangement. Heat energy removed from the battery is typically instantly dissipated to the ambient environment through a main radiator of the vehicle. For example, a prior art example of typical battery cooling system is illustrated in FIG. 1. FIG. 1 shows a battery thermal management system 1 according to the prior art. The battery thermal management system 1 includes a battery pack 2, a radiator or heat exchanger 3, and a pump 4 interconnected by a coolant loop 5. A coolant is circulated by the pump 4 through the coolant loop 5 to transfer heat from the battery pack 2 to the coolant and transfers the heat from the coolant to the radiator 3. Air is caused to flow through the radiator 3 by a fan 6. The heat transferred to the radiator 3 is transferred to the air flowing through the radiator 3 and dissipated by the air.

However, a non-uniform heat load of the cooling loop 5 from the battery pack 2 requires oversizing of the radiator 3, the fan 6, and the pump 4 in order to reject a heat load during peak heat generation from the battery pack 2. Due to oversizing of the fan 6 and the pump 4, electrical energy consumption by the fan 6 and the pump 4 is higher than necessary, resulting in a lower efficiency of the vehicle.

Accordingly, it is desired to have a battery thermal management system including a heat capacitor, wherein heat load peaks received by a radiator are minimized and a size of the radiator is minimized.

SUMMARY

In accordance and attuned with the present invention, a battery thermal management system including a heat capacitor, wherein heat load peaks received by a radiator are minimized and a size of the radiator is minimized has surprisingly been discovered.

According to an embodiment of the invention, a battery thermal management system includes a battery pack, a heat exchanger in fluid communication with the battery pack, a pump interposed between the heat exchanger and the battery pack to cause a heat exchange fluid to flow in a coolant loop between the heat exchanger and the battery pack. A heat capacitor is disposed downstream from the battery pack with respect to a direction of a flow of the heat exchange fluid through the coolant loop and upstream from the heat exchanger in the direction of the flow of the heat exchange fluid through the coolant loop. A valve is disposed in the coolant loop upstream from the heat capacitor in the direction of the flow of the coolant through the coolant loop. The valve controls at least a portion of the flow of the coolant through at least one of the heat capacitor and the heat exchanger.

According to another embodiment of the invention, a battery thermal management system includes a coolant loop conveying a heat exchange fluid therethrough. The coolant loop includes a battery pack, a heat exchanger, a valve, a heat capacitor, and a pump in fluid communication with each other. The heat capacitor is disposed upstream from the heat exchanger and downstream from the battery pack and the valve with respect to a direction of a flow of the heat exchange fluid through the coolant loop. A bypass loop extends from the valve to a branch point intermediate the heat capacitor and the heat exchanger, the bypass loop bypassing the heat capacitor.

According to yet another embodiment of the invention, a battery thermal management system includes a coolant loop conveying a heat exchange fluid therethrough. The coolant loop includes a battery pack, a heat exchanger, a valve, and a pump in fluid communication with each other. The valve is disposed upstream from the heat exchanger and downstream from the battery pack with respect to a direction of a flow of the heat exchange fluid through the coolant loop. A secondary loop extends from the valve and returns to the valve. The secondary loop includes a heat capacitor.

DESCRIPTION OF THE DRAWINGS

The above objects and advantages of the invention, as well as others, will become readily apparent to those skilled in the art from reading the following detailed description of an embodiment of the invention when considered in the light of the accompanying drawings, in which.

DETAILED DESCRIPTION OF AN EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
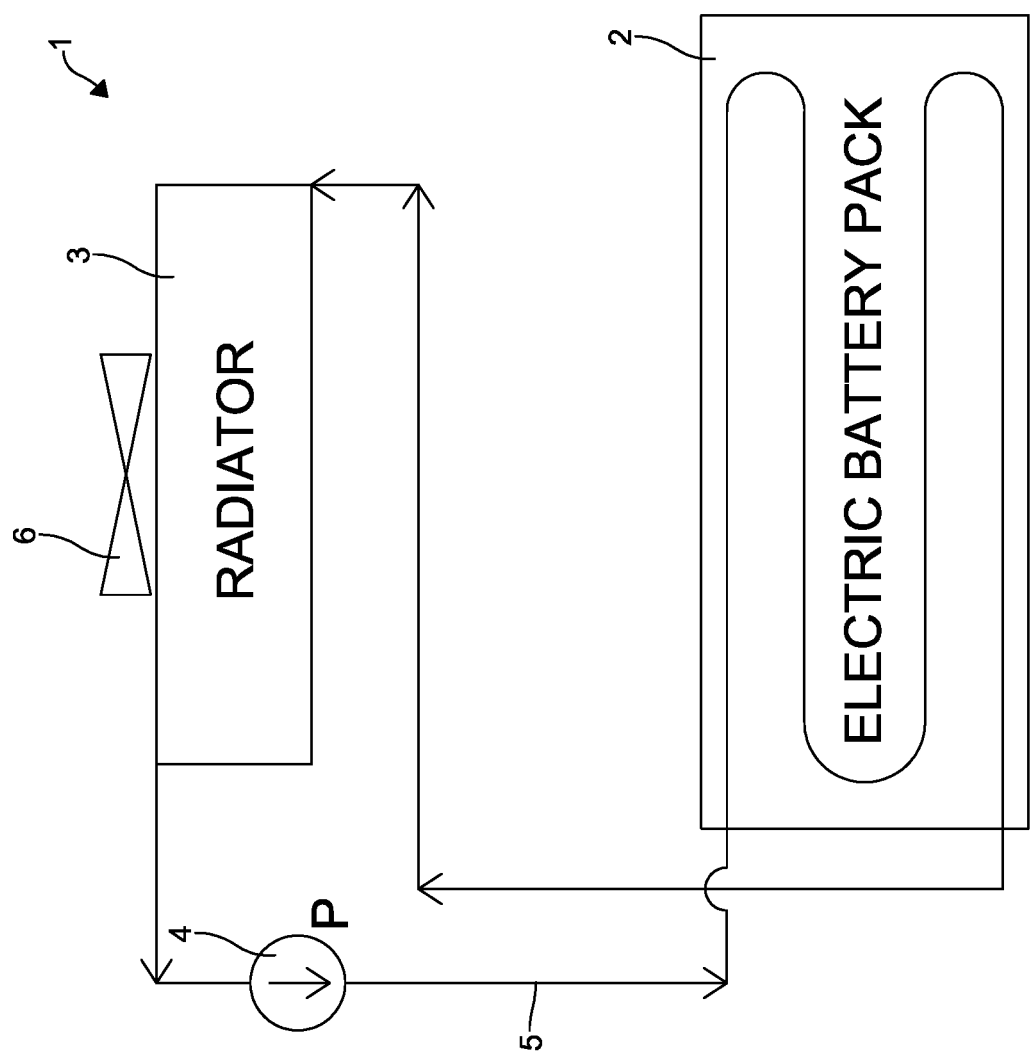
FIG. 1 is a schematic circuit diagram of a battery thermal management system according to prior art.
Figure 2:
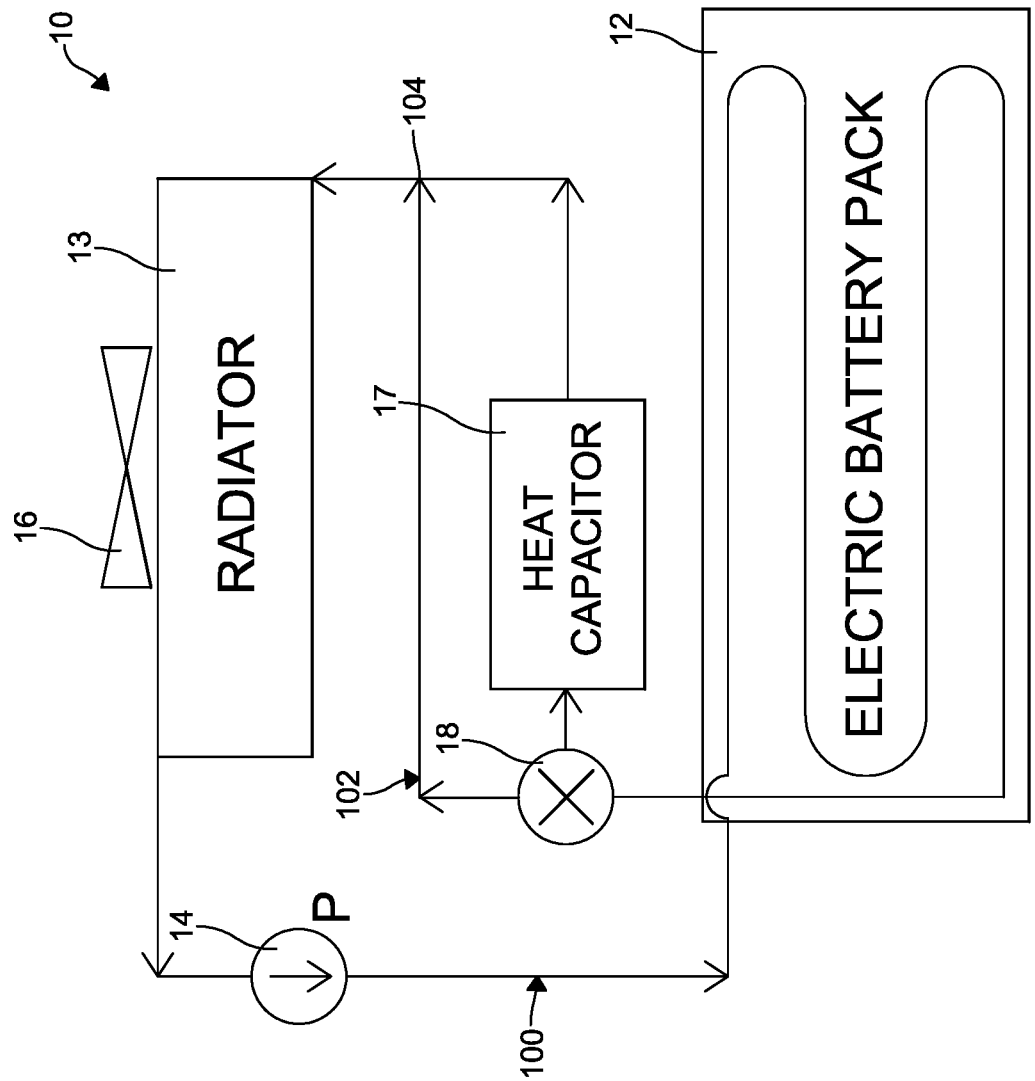
FIG. 2 is a schematic circuit diagram of a battery thermal management system according to an embodiment of the invention.

FIG. 2 shows a battery thermal management system 10 of a vehicle according to an embodiment of the invention. The battery thermal management system 10 includes a battery pack 12, a radiator or heat exchanger 13, a pump 14, a heat capacitor 17, and a valve 18 interconnected by a coolant loop 100. The coolant loop 100 includes a heat exchange fluid flowing therethrough. For example, the heat exchange fluid is a coolant. However, it is understood the heat exchange fluid can be any heat exchange fluid such as a refrigerant or water without departing from the scope of the disclosure.

The battery pack 12 may include one battery or a plurality of batteries therein. The battery pack 12 is configured as a rechargeable battery or plurality of rechargeable batteries (See FIGS. 3-4) providing electrical power to a motor (not shown) of a vehicle to propel the vehicle. The battery pack 12 also provides electrical power to other system components (not shown) included as part of the vehicle such as lighting, instruments, and control systems, for example. It is understood any type of battery can be used without departing from the scope of the invention. The battery pack 12 typically includes a housing (not shown) surrounding the battery or the plurality of the batteries. The coolant loop 100 is in heat exchange relationship with the battery pack 12 to transfer heat from the battery pack 12 to the heat exchange fluid circulating through the coolant loop 100. The heat exchange fluid is circulated through the coolant loop 100 by the pump 14. A direction of a flow of the heat exchange fluid through the coolant loop 100 is indicated by the arrows.

The valve 18 is disposed downstream of the battery pack 12 with respect to the direction of the flow of the heat exchange fluid and upstream of the heat capacitor 17 in the direction of the flow of the heat exchange fluid. The valve 18 controls the flow of the heat exchange fluid through the heat capacitor 17 and a bypass loop 102. The valve 18 selectively opens and closes the flow of the heat exchange fluid through the bypass loop 102. During a first operation mode of the vehicle, the valve 18 opens the flow of the heat exchange fluid through the bypass loop 102 and bypasses the flow of the heat exchange fluid around the heat capacitor 17. During a second operation mode of the vehicle, such as during operations where a load on the battery is high or non-uniform peaks in the heat generated by the battery pack 12, the valve 18 closes the flow of the heat exchange fluid through the bypass loop 102 and permits the heat exchange fluid to flow through the heat capacitor 17. It is understood in another example, the valve 18, in a third operation of the vehicle, can permit flow of the heat exchange fluid through both the bypass loop 102 and the heat capacitor 17. It is understood the valve 18 can be any type of valve such as a 3-way valve or a 4-way valve, for example. A controller, solenoid, or actuator (not shown) is configured to control a position of the valve 18 to control a direction of flow of the heat exchange fluid between the heat capacitor 17 and the bypass loop 102.

The bypass loop 102 exits the coolant loop 100 at the valve 18 and re-enters the coolant loop 100 at a branch point 104 located downstream from the heat capacitor 17 with respect to the direction of the flow of the heat exchange fluid through the radiator 13. It is understood the bypass loop 102 can exit and re-enter the coolant loop 100 at other positions in the coolant loop 100 as desired to bypass the heat capacitor 17.

The heat capacitor 17 includes a heat exchanger configured to exchange heat between the heat exchange fluid and a phase change material (PCM). It is understood the heat exchanger can be any type of heat exchanger as desired. The phase change material is typically a substance with a high heat of fusion, wherein melting and solidifying at a certain temperature facilitates storing and releasing large amounts of heat energy. Heat energy is absorbed when the material changes from a solid form to a liquid form or released when the material changes from the liquid form to the solid form. It is understood the PCM can be any PCM such as an organic PCM, an inorganic PCM, a eutectic material, a hygroscopic material, a solid-solid PCM material, or other type of PCM, as desired, without departing from the scope of the invention. In one embodiment, the PCM is hermetically sealed in the heat exchanger of the heat capacitor 17 and is in heat transfer communication with the coolant.

The radiator 13 is disposed downstream of the heat capacitor 17 with respect to the direction of the flow of the heat exchange fluid through the coolant loop 100. Air is caused to flow through the radiator 13 by a fan 16. The air is in heat transfer communication with the heat exchange fluid flowing through the radiator 13 to remove the heat from the heat exchange fluid and dissipate the heat away from the battery thermal management system 10.

In the embodiment shown, the pump 14 is disposed downstream of the radiator 13 with respect to the direction of the flow of the heat exchange fluid through the coolant loop 100. The pump 14 is disposed upstream of the battery pack 12 with respect to the direction of the flow of the heat exchange fluid through the coolant loop 100. Any type of pump can be used without departing from the scope of the invention. The pump 14 causes the heat exchange fluid to flow through the coolant loop 100 through each of the battery pack 12, the valve 18, the heat capacitor 17 or the bypass loop 102, the branch point 104, and the radiator 13.

During operation, the heat exchange fluid is circulated through the battery pack 12 to remove heat therefrom. The heat removed from the battery pack 12 is transferred to the heat exchange fluid and flows with the heat exchange fluid to the valve 18. If the valve 18 is open to the heat capacitor 17 the heat exchange fluid flows into the heat capacitor 17 where a partial amount or an entirety of the heat transferred form the battery pack 12 to the heat exchange fluid is transferred to the PCM in the heat capacitor 17. The heat exchange fluid then flows to the radiator 13 where any of the heat transferred from the battery pack 12 to the heat exchange fluid which was not transferred to the PCM in the heat capacitor 17 is transferred from the heat exchange fluid to the air flowing through the radiator 13. The heat transferred to the air is then dissipated and removed from the battery thermal management system 10. Conversely, if the valve 18 is open to the bypass loop 102, the heat exchange fluid flows through the bypass loop 102 to the radiator 13 without flowing through the heat capacitor 17. At the radiator 13, the heat transferred from the battery pack 12 to the heat exchange fluid is transferred from the heat exchange fluid to the air flowing through the radiator 13. The heat transferred to the air flowing through the radiator 13 is dissipated and removed from the battery thermal management system 10. As mentioned hereinabove, it is also understood the valve 18 could be positioned to allow the heat exchange fluid to flow through both the heat capacitor 17 and the bypass loop 102, if desired.

Figure 3:
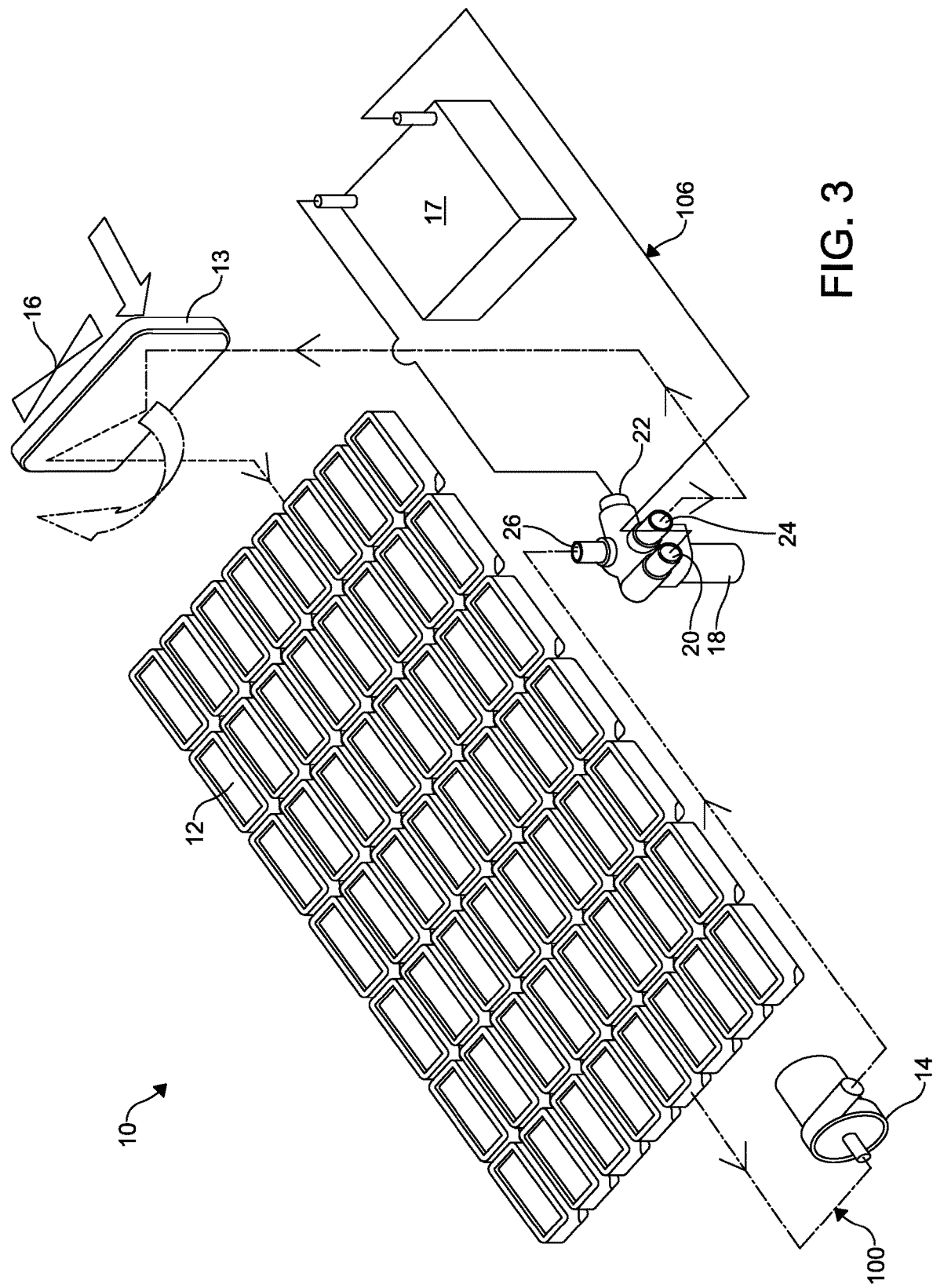
FIG. 3 is a schematic circuit diagram of a battery thermal management system according to another embodiment of the invention, wherein a heat capacitor is bypassed and not in use.
Figure 4:
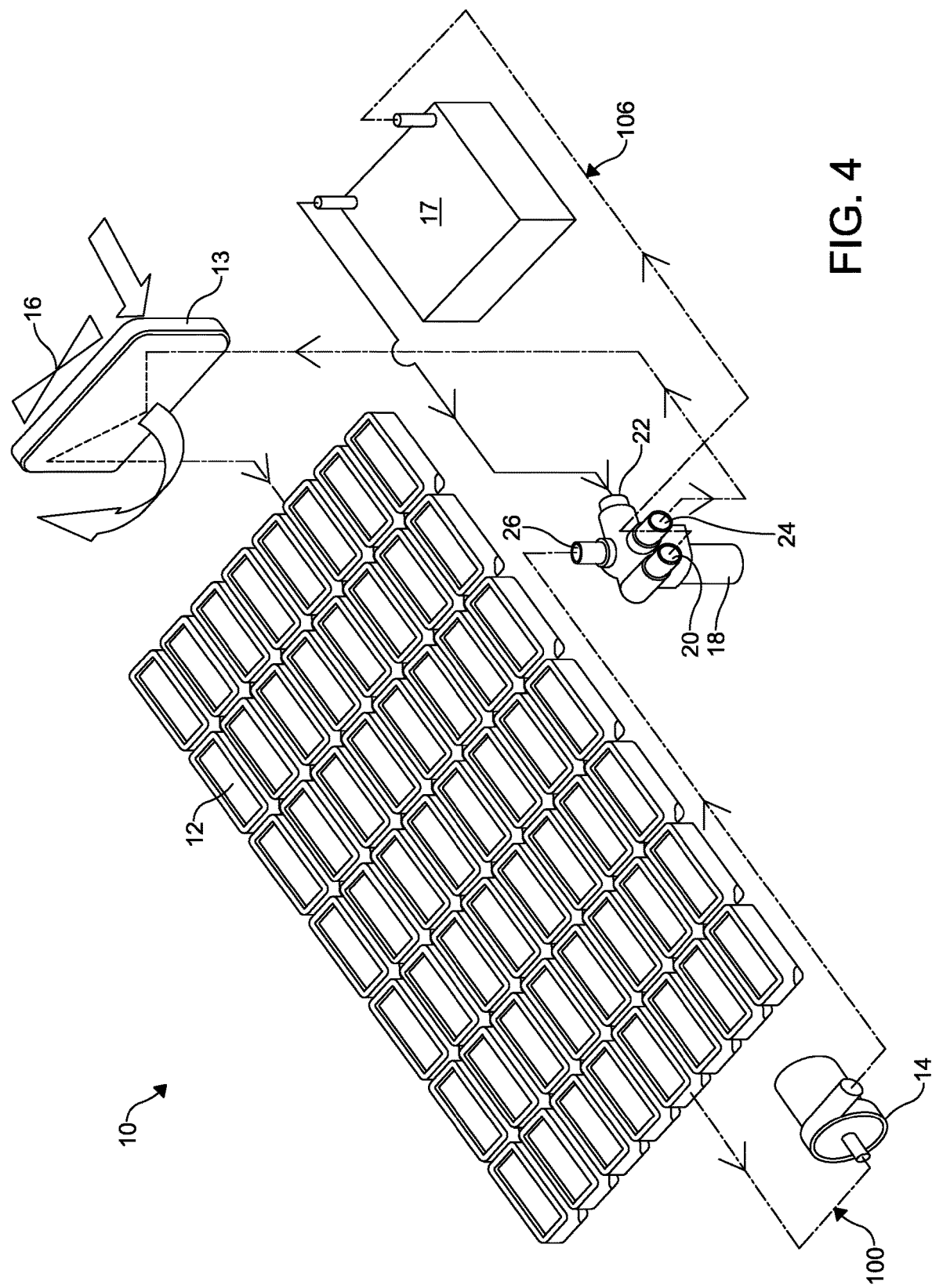
FIG. 4 is a schematic circuit diagram of the battery thermal management system of FIG. 3, wherein the heat capacitor is not bypassed and in use.

FIGS. 3 and 4 show an alternate thermal management system 100 using the valve 18 configured as a 4-way valve and the bypass loop 102 is eliminated. The thermal management system 100 of FIGS. 3 and 4 is substantially similar to the thermal management system 100 of FIG. 2. Therefore, reference numerals used to describe and show components of the thermal management system 100 of FIG. 2 are used to show and describe the same or similar components of the thermal management system 100 of FIGS. 3-4. According to this configuration, the valve 18 is disposed upstream from the battery pack 12 and downstream from the radiator 13 with respect to the direction of the heat exchange fluid through the coolant loop 100. The heat capacitor 17 is disposed in a secondary loop 106 extending from a secondary loop outlet 20 of the valve 18 and returning back to the valve 18 at a secondary loop inlet 22 of the valve 18. During the second operation of the vehicle, such as during operations where a load on the battery is high or non-uniform peaks in the heat generated by the battery pack 12, the heat exchange fluid can flow through the valve 18, through a coolant loop inlet 26, through the valve 18 and to the heat capacitor 17, out of the heat capacitor 17 and back to the valve 18, and from the valve 18 to the radiator 13. (As shown with dashed lines in FIG. 4). During the first operation of the vehicle, when it is desired to flow directly to the radiator 13 and not through the heat capacitor 17 from the valve 18, the valve 18 is positioned to be only open to the radiator 13. (As shown with dashed lines in FIG. 3). During the first operation, the heat exchange fluid flows through the valve 18 through the coolant loop inlet 26 and directly to the radiator 13 through a coolant loop outlet 24.

By using the battery thermal management systems 10, described hereinabove, heat generated by the battery pack 12 may be dissipated instantly through the radiator 13 by bypassing the heat capacitor 17. Any non-uniform peaks in the heat generated by the battery pack 12 can be accumulated in the PCM of the heat capacitor 17 by changing the position of the valve 18 to direct the flow of the heat exchange fluid through the heat capacitor 17. In one embodiment, this is accomplished by detecting an increase in a temperature of the heat exchange fluid and controlling the valve 18 to permit the flow of the heat exchange fluid to flow to the heat capacitor 17. The excess heat in the heat exchange fluid is transferred to the PCM of the heat capacitor 17 and militates against the radiator 13 overheating. Once the heat load on the battery thermal management system 10 decreases to a predetermined desired level, the heat accumulated in the PCM of the heat capacitor 17 is released and transferred back to the heat exchange fluid, which then flows from the heat capacitor 17 to the radiator 13. At the radiator 13, the heat is transferred from the heat exchange fluid to the air flowing through the radiator 13 and dissipated and removed from the battery thermal management system 10.

Accordingly, the heat rejected by the battery thermal management system 10 is maintained at a substantially uniform level, which allows the use of the radiator 13 that is smaller in dimensions compared to prior art radiators. Additionally, the battery thermal management system 10 allows the use of a smaller motor for the fan 16, a smaller pump 14, and a smaller motor for the pump 14 compared to prior art motors for fans, pump, and motors for pumps. These smaller dimensions minimize the overall packaging size of the battery thermal management system 10, minimizes electrical energy consumption of the battery thermal management system 10, minimizes air drag on the radiator 13, minimizes an overall weight of the battery thermal management system 10, and maximizes an efficiency of the battery thermal management system 100. Further, by using the cooling loop 100 for cooling the battery pack 12, the need for a more expensive active air conditioning system is avoided.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A battery thermal management system comprising:
   a coolant loop conveying a heat exchange fluid therethrough, the coolant loop including a battery pack, a heat exchanger, a valve, a heat capacitor, and a pump in fluid communication with each other, the heat capacitor disposed upstream from the heat exchanger and downstream from the battery pack and the valve with respect to a direction of a flow of the heat exchange fluid through the coolant loop; and
   a bypass loop extending from the valve to a branch point intermediate the heat capacitor and the heat exchanger, the bypass loop bypassing the heat capacitor.

2. The battery thermal management system of claim 1, wherein the pump is disposed downstream from the heat exchanger and upstream from the battery pack with respect to the direction of the flow of the heat exchange fluid through the coolant loop.

3. The battery thermal management system of claim 1, wherein the heat capacitor includes a phase change material configured to exchange heat with the heat exchange fluid flowing through the heat capacitor.

4. The battery thermal management system of claim 1, wherein the heat exchanger is a radiator.

5. The battery thermal management system of claim 1, wherein the valve selectively opens and closes to convey the heat exchange fluid through at least one of the bypass loop and the heat capacitor.

6. The battery thermal management system of claim 1, wherein the heat exchange fluid is a coolant.

7. The battery thermal management system of claim 1, wherein the valve is a 3-way valve.

8. The battery thermal management system of claim 1, wherein the valve is a 4-way valve.

9. The battery thermal management system of claim 4, wherein a fan directs air through the radiator.

10. The thermal management system of claim 1, wherein the valve is disposed upstream from the heat capacitor in the direction of the flow of the heat exchange fluid through the coolant loop.

11. The thermal management system of claim 1, wherein the valve is configured to control at least a portion of the flow of the heat exchange fluid through at least one of the heat capacitor and the heat exchanger.

12. A battery thermal management system comprising:
    a coolant loop conveying a heat exchange fluid therethrough, the coolant loop including a battery pack, a heat exchanger, a valve, a heat capacitor, and a pump in fluid communication with each other, wherein the heat capacitor is disposed upstream from the heat exchanger and downstream from the battery pack and the valve with respect to a direction of a flow of the heat exchange fluid through the coolant loop, and wherein the valve is disposed downstream of the battery pack with respect to the direction of a flow of the heat exchange fluid through the coolant loop; and a bypass loop extending from the valve to a branch point intermediate the heat capacitor and the heat exchanger, wherein the bypass loop bypasses the heat capacitor, and wherein the valve selectively conveys the heat exchange fluid passing through the battery pack directly to the heat exchanger or the heat capacitor.

13. The battery thermal management system of claim 12, wherein the heat capacitor includes a phase change material configured to exchange heat with the heat exchange fluid flowing through the heat capacitor.

14. The battery thermal management system of claim 12, wherein the pump is disposed downstream from the heat exchanger and upstream from the battery pack with respect to the direction of the flow of the heat exchange fluid through the coolant loop.

15. A battery thermal management system comprising:

a coolant loop conveying a heat exchange fluid therethrough, the coolant loop including a battery pack, a heat exchanger, a valve, a heat capacitor, and a pump in fluid communication with each other, wherein the heat capacitor is disposed upstream from the heat exchanger and downstream from the battery pack and the valve with respect to a direction of a flow of the heat exchange fluid through the coolant loop, and wherein the valve is disposed downstream of the battery pack and upstream from the heat capacitor with respect to the direction of the flow of the heat exchange fluid through the coolant loop; and a bypass loop extending from the valve to a branch point intermediate the heat capacitor and the heat exchanger, wherein the bypass loop bypasses the heat capacitor, and wherein the valve is configured to control at least a portion of the flow of the heat exchange fluid through at least one of the heat capacitor and the heat exchanger.

16. The battery thermal management system of claim 15, wherein the heat capacitor includes a phase change material configured to exchange heat with the heat exchange fluid flowing through the heat capacitor.

17. The battery thermal management system of claim 15, wherein the pump is disposed downstream from the heat exchanger and upstream from the battery pack with respect to the direction of the flow of the heat exchange fluid through the coolant loop.

* * * * *